US012352413B2

(12) United States Patent
Xu et al.

(10) Patent No.: US 12,352,413 B2
(45) Date of Patent: Jul. 8, 2025

(54) LED LAMP

(71) Applicant: SHENZHEN SNC OPTO ELECTRONIC CO., LTD., Guangdong (CN)

(72) Inventors: Jianyong Xu, Guangdong (CN); Zhihui Tan, Guangdong (CN); Shengwei Pang, Guangdong (CN)

(73) Assignee: SHENZHEN SNC OPTO ELECTRONIC CO., LTD., Shenzhen (CN)

(*) Notice: Subject to any disclaimer, the term of this patent is extended or adjusted under 35 U.S.C. 154(b) by 0 days.

(21) Appl. No.: 18/642,836

(22) Filed: Apr. 23, 2024

(65) Prior Publication Data

US 2025/0198604 A1 Jun. 19, 2025

(30) Foreign Application Priority Data

Dec. 13, 2023 (CN) ......................... 202323400889.6

(51) Int. Cl.

| | |
|---|---|
| ***F21V 19/02*** | (2006.01) |
| ***F21V 3/06*** | (2018.01) |
| ***F21V 31/00*** | (2006.01) |
| ***F21Y 105/18*** | (2016.01) |
| ***F21Y 115/20*** | (2016.01) |

(52) U.S. Cl.

CPC .............. *F21V 19/02* (2013.01); *F21V 3/061* (2018.02); *F21V 31/005* (2013.01); *F21Y 2105/18* (2016.08); *F21Y 2115/20* (2016.08)

(58) Field of Classification Search

CPC ........ F21V 19/02; F21V 3/061; F21V 31/005; F21Y 2105/18; F21Y 2115/20

See application file for complete search history.

(56) References Cited

U.S. PATENT DOCUMENTS 5,461,552 A * 10/1995 Tillery .................. F21V 14/025 362/205
6,641,279 B1 * 11/2003 Williams .............. F21V 21/406 362/198
9,909,726 B2 * 3/2018 Law .................... H01M 50/213
2006/0034074 A1 * 2/2006 Ko .......................... F21L 4/027 362/205
2010/0002422 A1 * 1/2010 Ho ........................ F21V 14/065 362/187
2010/0290229 A1 * 11/2010 Meyer, Sr. .............. F21V 14/06 362/282
2012/0147606 A1 * 6/2012 Huang .................... F21V 17/02 362/277

(Continued)

*Primary Examiner* — Tsion Tumebo

(57) ABSTRACT

An LED lamp includes a lamp body; an LED lamp panel; a driving power supply mounted in the lamp body and electrically connected to the LED lamp panel; a fixing base mounted on the lamp body; a reflective cover provided on the fixing base and configured to receive the LED lamp panel; a rotating assembly mounted on the fixing base; an adjusting member fixedly connected to the rotating assembly; and a lens panel covering the LED lamp panel, the lens panel being provided with a connecting portion that is movably connected to the adjusting member. The rotating assembly is configured to drive the adjusting member to rotate, and the adjusting member is configured to drive the lens panel to move upward and downward through the connecting portion.

8 Claims, 5 Drawing Sheets

(56) References Cited

U.S. PATENT DOCUMENTS

| | | | | |
|---|---|---|---|---|
| 2014/0049967 A1* | 2/2014 | Zhou | F21K 9/23 362/287 |
| 2018/0156423 A1* | 6/2018 | Murby | F21S 8/026 |

* cited by examiner

LED LAMP

CROSS-REFERENCE TO RELATED APPLICATIONS

This application claims priority of Chinese Utility Model application No. 2023234008896, filed on Dec. 13, 2023, entitled "LED LAMP", the entire content of which is incorporated herein in its entirety.

TECHNICAL FIELD

The present disclosure relates to LED lightings, and in particular to an LED lamp.

BACKGROUND

LED lamps have many advantages such as energy saving, environmental protection, long life, and have been widely used in various lighting places. The conventional LED lamp generally includes a lens panel, but a position of the lens panel of the existing LED lamp is fixed, and the position of the lens panel cannot be flexibly adjusted according to requirements of different use places, so that a light distribution direction of the LED lamp cannot be adjusted. Therefore, it is necessary to improve a structure of the LED lamp.

SUMMARY

According to various embodiments, an LED lamp with an adjustable light emitting angle is provided.

An LED lamp includes a lamp body; an LED lamp panel; a driving power supply mounted in the lamp body and electrically connected to the LED lamp panel; a fixing base mounted on the lamp body; a reflective cover provided on the fixing base and configured to receive the LED lamp panel; a rotating assembly mounted on the fixing base; an adjusting member fixedly connected to the rotating assembly; and a lens panel covering the LED lamp panel, the lens panel being provided with a connecting portion that is movably connected to the adjusting member. The rotating assembly is configured to drive the adjusting member to rotate, and the adjusting member is configured to drive the lens panel to move upward and downward through the connecting portion.

In one of the embodiments, the rotating assembly includes a limiting ring and a rotating ring, the limiting ring is fixed to the fixing base and is provided with a limiting portion protruding outward, the rotating ring is provided with an annular groove, the limiting portion is received in the annular groove, and a length of the annular groove is greater than a length of the limiting portion.

In one of the embodiments, the rotating ring is provided with a plurality of scale marks.

In one of the embodiments, the adjusting member is provided with a through hole, the rotating ring is provided with a threaded hole, and the adjusting member is fixedly connected to the rotating assembly through a screw extending through the through hole and fixed in the threaded hole.

In one of the embodiments, the LED lamp further includes a first sealing ring provided between the limiting ring and the rotating ring.

In one of the embodiments, the LED lamp further includes a second sealing ring provided between the limiting ring and the fixing base.

In one of the embodiments, the adjusting member is provided with an inclined or arc-shaped elongated hole, and the connecting portion is located at an edge of the lens panel and extends into the elongated hole.

In one of the embodiments, the LED lamp further includes a glass plate abutting against the lens panel.

In one of the embodiments, a side of the lens panel adjacent to the LED lamp panel is provided with a limiting post, the LED lamp panel is provided with a limiting hole corresponding to the limiting post, and the limiting post is inserted into the limiting hole.

In one of the embodiments, the LED lamp further includes a mounting bracket connected to the lamp body, and the LED lamp being a double-head lamp.

These and other objects, advantages, purposes and features will become apparent upon review of the following specification in conjunction with the drawings.

BRIEF DESCRIPTION OF THE DRAWINGS

The drawings are only for illustrative purposes and represent only schematic views rather than actual drawings, which cannot be understood as limitations of the present disclosure. In order to better illustrate the embodiments of the present disclosure, some components in the drawings may be omitted, enlarged or reduced, which does not represent the size of the actual product. For those skilled in the art, some well-known structures in the drawings and the descriptions thereof may be omitted.

REFERENCE SIGNS

Figure 1:
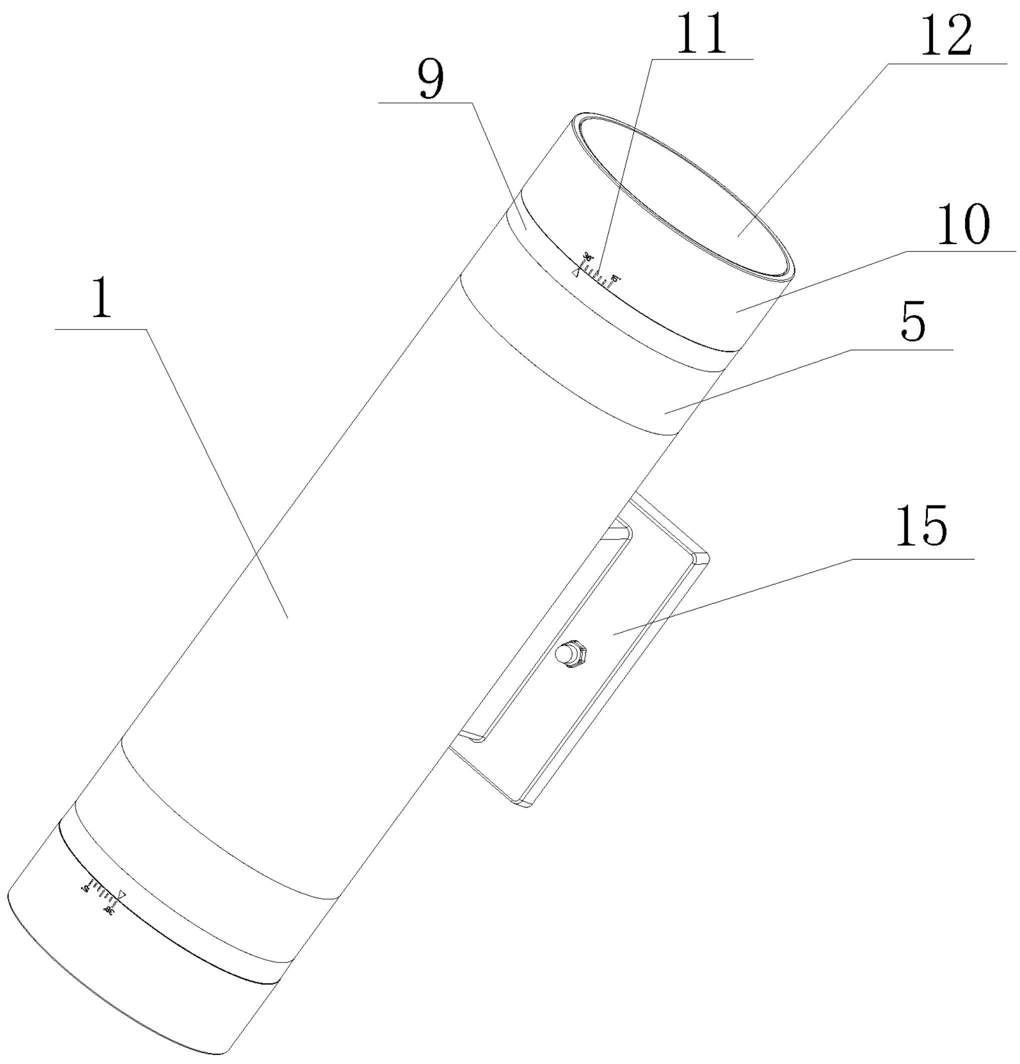
FIG. 1 is a perspective view of an LED lamp according to an embodiment of the present disclosure.

1. Lamp body; 2. LED lamp panel; 3. Lens panel; 4. Driving power supply; 5. Fixing base; 6. Reflective cover; 7. Adjusting member; 8. Connecting portion; 9. Limiting ring; 10. Rotating ring; 11. Scale mark; 12. Glass plate; 13. Elongated hole; 14. Limiting post; 15. Mounting bracket.

DETAILED DESCRIPTION OF THE EMBODIMENTS

The technical solution in the embodiment of the present application will be clearly and completely described below in conjunction with the drawings in the embodiment of the application. Apparently, the described embodiments are only some of the embodiments of the application, not all of them. Based on the embodiments in the present application, all other embodiments obtained by a person skilled in the art without making creative efforts shall all fall within the protection scope of the present application.

In the drawings of the embodiments of the present disclosure, the same or similar numbers correspond to the same or similar components. In the description of the present disclosure, it should be understood that terms "upper", "lower", "front" and "rear", "left", "right", "vertical", "horizontal", "lateral", "longitudinal", "top", "bottom", "inner", "outer", and other indicated orientation or positional relationships are based on the orientation or positional relationship shown in the drawings for convenience and simplicity of description of the present disclosure only, and not as an indication or implication that the devices or elements referred to must have or be constructed or operated in a specific orientation. Therefore, the terms describing positional relationships in the drawings are only for illustrative purposes and should not be construed as limitations of the present disclosure.

Figure 2:
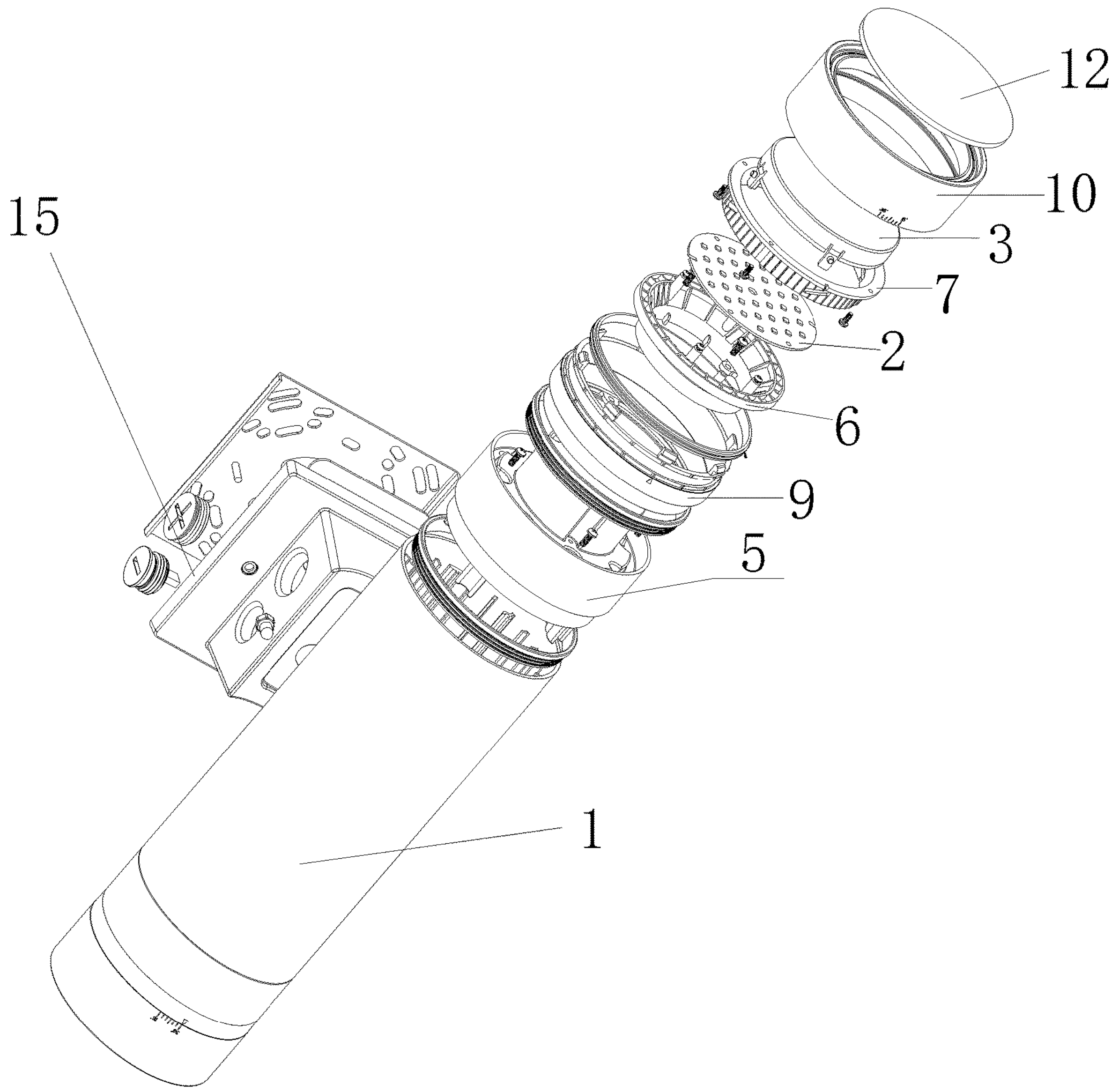
FIG. 2 is an exploded view of the LED lamp shown in FIG. 1.
Figure 3:
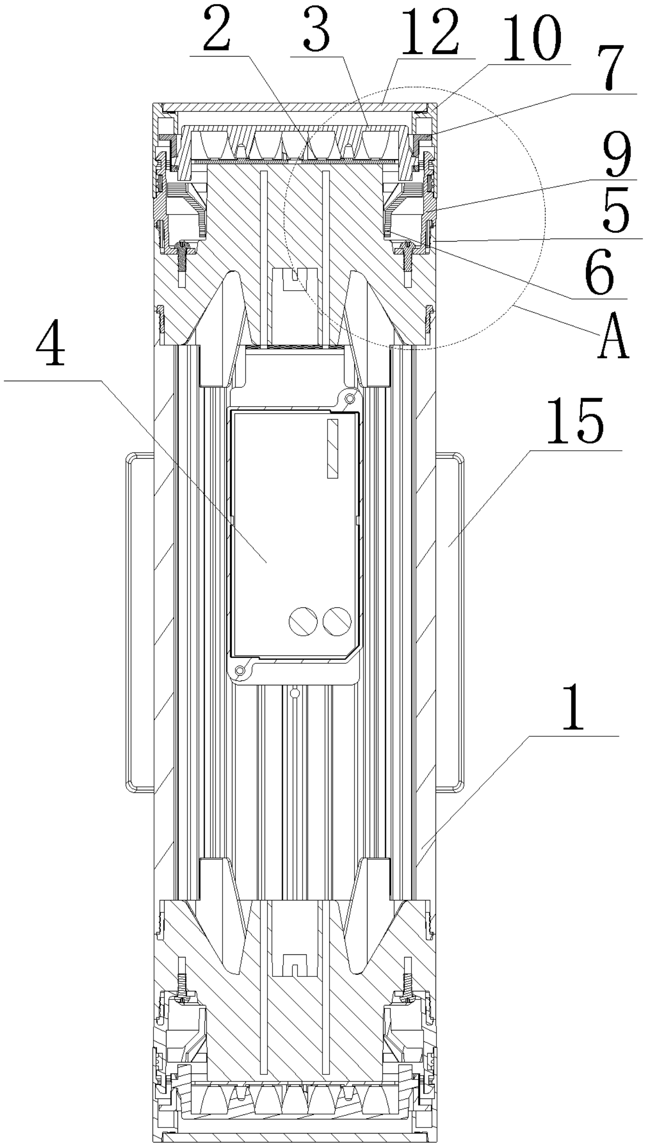
FIG. 3 is a cross-sectional view of the LED lamp shown in FIG. 1.
Figure 4:
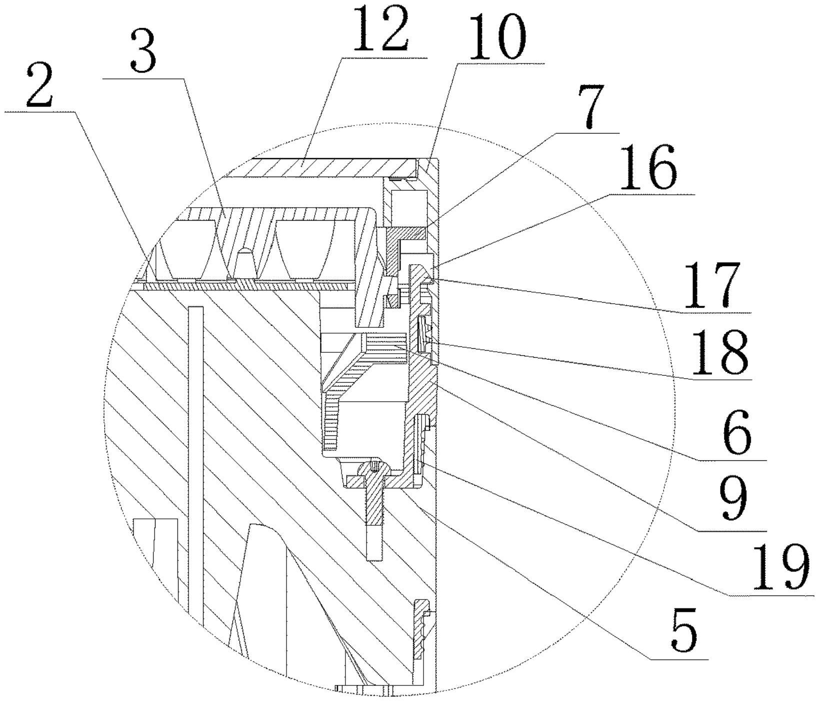
FIG. 4 is an enlarged view of portion A of FIG. 3.
Figure 5:
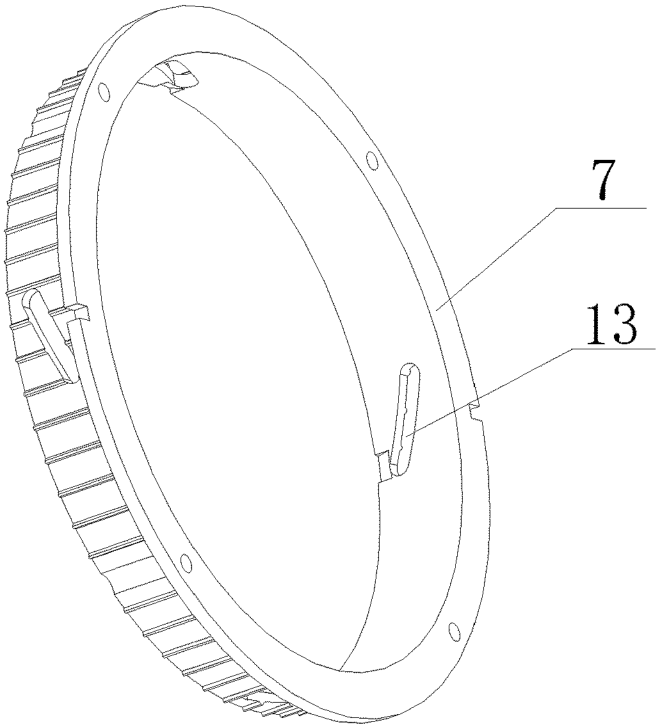
FIG. 5 is an enlarged perspective view of an adjusting member shown in FIG. 2.
Figure 6:
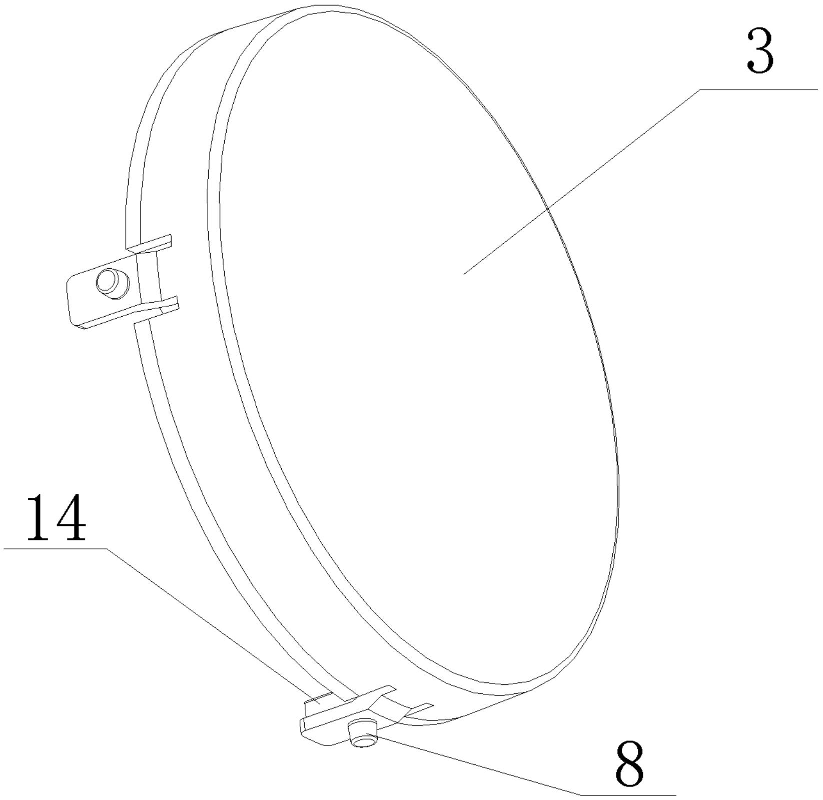
FIG. 6 is an enlarged perspective view of a lens panel shown in FIG. 2.

Referring to FIGS. 1 to 6, an LED lamp is provided according to an embodiment of the present disclosure. The LED lamp includes a lamp body 1, an LED lamp panel 2, a lens panel 3, a driving power supply 4, a fixing base 5, a reflective cover 6, a rotating assembly, and an adjusting member 7. The driving power supply 4 is mounted in the lamp body 1 and is electrically connected to the LED lamp panel 2. The fixing base 5 is mounted on the lamp body 1. In an embodiment, the fixing base 5 has a heat dissipation function. The reflective cover 6 is provided on the fixing base 5. The LED lamp panel 2 is mounted in the reflective cover 6. The lens panel 3 covers the LED lamp panel 2. The rotating assembly is mounted on the fixing base 5. The adjusting member 7 is fixedly connected to the rotating assembly. The lens panel 3 is provided with a connecting portion 8, and the connecting portion 8 is movably connected to the adjusting member 7. The rotating assembly is configured to drive the adjusting member 7 to rotate, and the adjusting member 7 is configured to drive the lens panel 3 to move upward and downward through the connecting portion 8, so that a relative distance between the lens panel 3 and the LED lamp panel 2 is changed, thereby adjusting a light distribution direction of the LED lamp.

The adjusting member 7 is provided with an inclined or arc-shaped elongated hole 13. The connecting portion 8 is located at an edge of the lens panel 3, and the connecting portion 8 may be a post that extends into the elongated hole 13. When the adjusting member 7 rotates, an edge of the inclined or arc-shaped elongated hole 13 acts on the connecting portion 8, so that the connecting portion 8 moves along the elongated hole 13, which causes the lens panel 3 to move upward or downward, so as to adjust the relative position between the lens panel 3 and the LED lamp panel 2.

The rotating assembly includes a limiting ring 9 and a rotating ring 10. The limiting ring 9 is fixed to the fixing base 5 and is provided with a limiting portion 17 protruding outward. The rotating ring 10 is provided with an annular groove 16. The limiting portion 17 is received in the annular groove 16. A length of the annular groove 16 is greater than a length of the limiting portion 17, so that the limiting portion 17 can slide relative to the annular groove 16. When the rotating ring 10 is rotated, the rotating ring 10 can be more stably rotated by the limiting portion 17.

The adjusting member 7 is provided with a through hole, the rotating ring 10 is provided with a threaded hole aligned with the through hole, and the adjusting member 7 is fixedly connected to the rotating ring 10 through a screw extending through the through hole and fixed in the threaded hole.

The rotating ring 10 is provided with a plurality of scale marks 11, so that the lens panel 3 can be adjusted to a desired angle more accurately.

The LED lamp further includes a glass plate 12 abutting against the lens panel 3.

The LED lamp further includes a first sealing ring 18 provided between the limiting ring 9 and the rotating ring 10, so that the LED lamp panel 2 can achieve a good waterproof effect.

The LED lamp further includes a second sealing ring 19 provided between the limiting ring 9 and the fixing base 5, so that the LED lamp panel 2 can further achieve a good waterproof effect.

A side of the lens panel 3 adjacent to the LED lamp panel 2 is provided with a limiting post 14, the LED lamp panel 2 is provided with a limiting hole corresponding to the limiting post 14, and the limiting post 14 is inserted into the limiting hole. In this way, the lens panel 3 is limited on the LED lamp panel 2 through the limiting hole 14, so that the lens panel 3 can only move upward and downward without deviation.

The LED lamp may be a double-head lamp, two groups of the same structure are provided in the lamp body, and the two groups of the same structure are electrically connected to the driving power supply 4. The LED lamp further includes a mounting bracket 15 connected to the lamp body 1.

According to the above-mentioned LED, a position of the lens panel 3 can be conveniently adjusted according to the requirements of different use places, so that the light distribution direction of the LED lamp can be adjusted without an additional tool, and the operation is simple and convenient.

The above-mentioned embodiments do not constitute a limitation on the protection scope of the technical solution. Any modifications, equivalent replacements and improvements made within the spirit and principles of the above-mentioned embodiments shall be included within the protection scope of this technical solution.

The foregoing descriptions are merely specific embodiments of the present disclosure, but are not intended to limit the protection scope of the present disclosure. Any variation or replacement readily figured out by a person skilled in the art within the technical scope disclosed in the present disclosure shall all fall within the protection scope of the present disclosure.

What is claimed is:

1. An LED lamp, comprising:

a lamp body;

an LED lamp panel;

a driving power supply mounted in the lamp body and electrically connected to the LED lamp panel;

a fixing base mounted on the lamp body;

a reflective cover provided on the fixing base and configured to receive the LED lamp panel;

a rotating assembly mounted on the fixing base;

an adjusting member fixedly connected to the rotating assembly; and a lens panel covering the LED lamp panel, the lens panel being provided with a connecting portion that is movably connected to the adjusting member;

wherein the rotating assembly is configured to drive the adjusting member to rotate, and the adjusting member is configured to drive the lens panel to move upward and downward through the connecting portion;

wherein the rotating assembly comprises a limiting ring and a rotating ring, the limiting ring is fixed to the fixing base and is provided with a limiting portion protruding outward, the rotating ring is provided with an annular groove, the limiting portion is received in the annular groove, and a length of the annular groove is greater than a length of the limiting portion;

wherein the rotating ring is provided with a plurality of scale marks.

2. The LED lamp according to claim 1, wherein the adjusting member is provided with a through hole, the rotating ring is provided with a threaded hole, and the adjusting member is fixedly connected to the rotating assembly through a screw extending through the through hole and fixed in the threaded hole.

3. The LED lamp according to claim 1, further comprising a first sealing ring provided between the limiting ring and the rotating ring.

4. The LED lamp according to claim 1, further comprising a second sealing ring provided between the limiting ring and the fixing base.

5. The LED lamp according to claim 1, wherein the adjusting member is provided with an inclined or arc-shaped elongated hole, and the connecting portion is located at an edge of the lens panel and extends into the elongated hole.

6. The LED lamp according to claim 1, further comprising a glass plate abutting against the lens panel.

7. The LED lamp according to claim 1, wherein a side of the lens panel adjacent to the LED lamp panel is provided with a limiting post, the LED lamp panel is provided with a limiting hole corresponding to the limiting post, and the limiting post is inserted into the limiting hole.

8. The LED lamp according to claim 1, further comprising a mounting bracket connected to the lamp body, and the LED lamp being a double-head lamp.

* * * * *